April 9, 1963  E. G. GRIFFITHS  3,084,409
SUPPORT FOR WIRES AND THE LIKE
Filed June 3, 1960  2 Sheets-Sheet 1
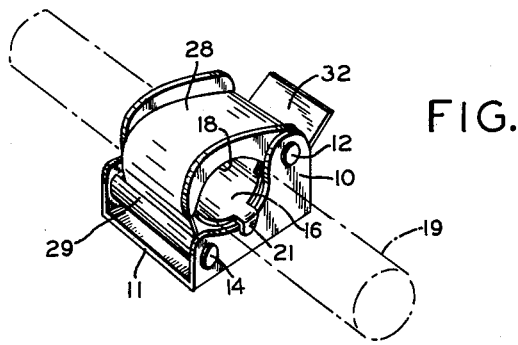
FIG. 1
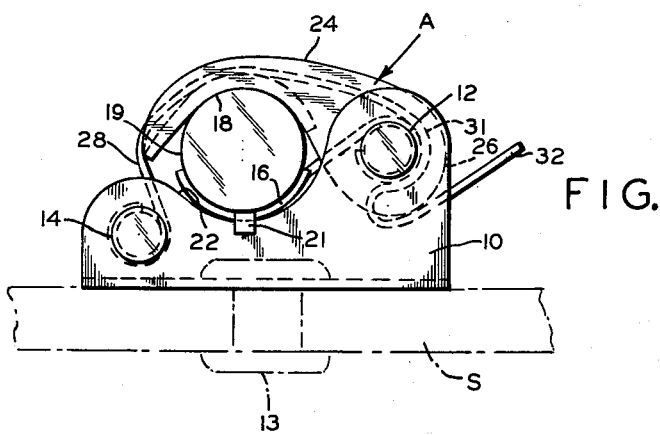
FIG. 2
FIG. 3
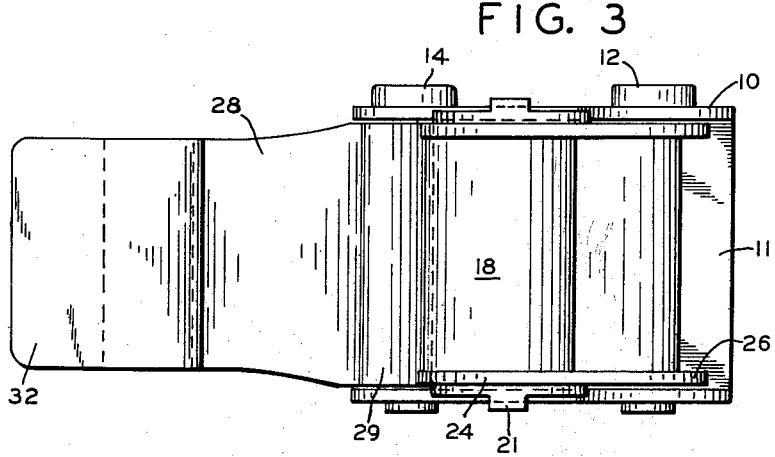
INVENTOR.
EDWARD G. GRIFFITHS
BY John P. Chandler
HIS ATTORNEY.

April 9, 1963   E. G. GRIFFITHS   3,084,409
SUPPORT FOR WIRES AND THE LIKE
Filed June 3, 1960   2 Sheets-Sheet 2
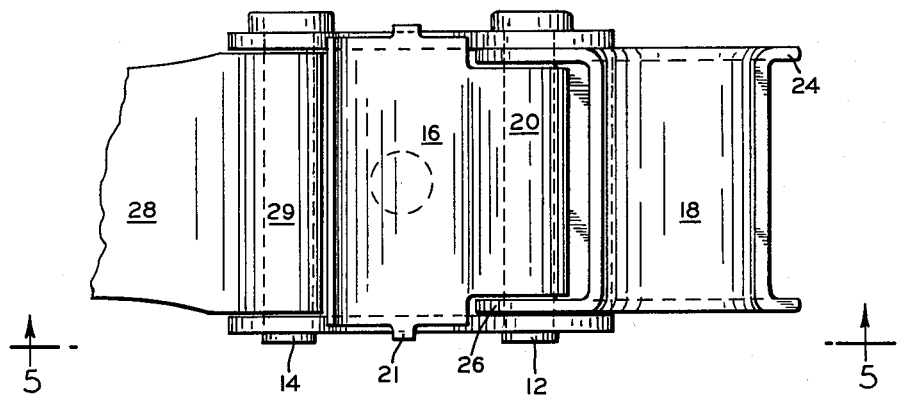
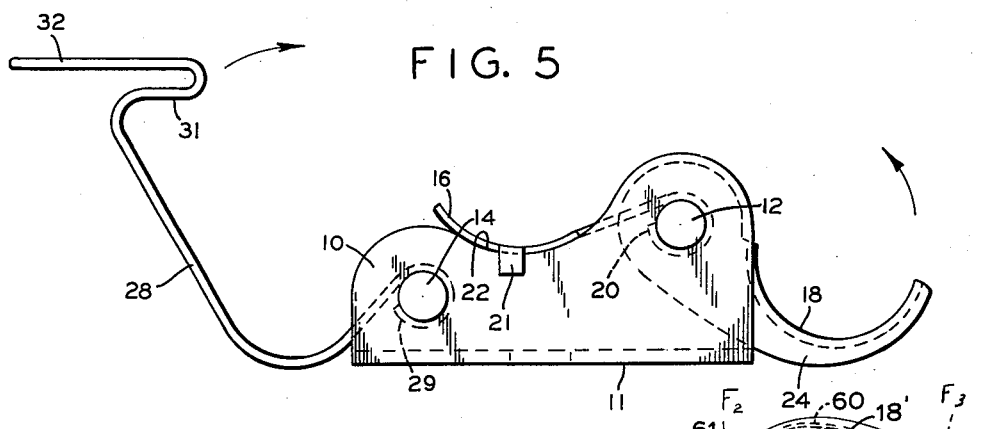
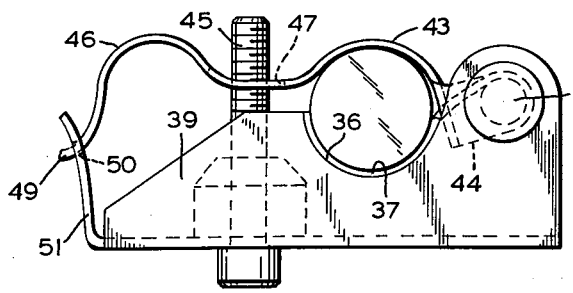
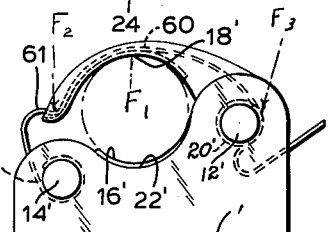
INVENTOR.
EDWARD G. GRIFFITHS
BY John P. Chandler
HIS ATTORNEY.

United States Patent Office 3,084,409
Patented Apr. 9, 1963

3,084,409
SUPPORT FOR WIRES AND THE LIKE
Edward G. Griffiths, Maywood, N.J., assignor to Camloc Fastener Corporation, Paramus, N.J., a corporation of New York
Filed June 3, 1960, Ser. No. 33,711
5 Claims. (Cl. 24—132)

This invention relates to clamps and fasteners and relates more particularly to clamping devices for detachably securing elongated elements such as wires, tubes, electrical conduits and the like, wherein it is essential that the elongated element be supported at spaced points without relative vibration between the element and the supports.

An important object of the invention is to provide a detachable fastening means for an elongated element such as a wire wherein the wire can be readily removed for inspection or for service purposes in the general area and wherein there are no loose parts likely to become lost during the period of detachment.

Another object of the invention is to provide a novel clamp having a pair of cooperating, channelled jaws mounted at one end of a base and which receive the wire therebetween. One or both of the jaws are pivoted on the base and the upper jaw is raised to introduce the wire. The jaws are then secured in clamped relation on the wire by means of novel fastening means which in one form of the invention comprises a keeper or clip made from spring metal and which is pivoted at the opposite end of the base. The keeper has a generally C-shape at its free end which snaps over the pivot element for the jaws where it is safely secured against accidental or unintentional dislodgment.

A further object of the invention is to provide an improved clamping device designed primarily for supporting tubes, conduits, wires and the like, in restricted areas in aircraft, such as in the engine area which is closed by a nacelle and wherein all of the elongated members must be quickly detached from their supporting structures whenever access is to be had to the area for purposes of inspection or service.

A further object of the invention is to provide a wire or tube clamp which will avoid chafing between the wire and the clamp and also avoid any movement between the wire and the support.

A more particular object of the invention is to provide a resilient support for fragile elongated elements, such as sensing wires used in fire control systems in aircraft and elsewhere, wherein the support must be firm and must avoid vibration of the wire at the points of support.

In the drawings:
FIG. 1 is a perspective view of a wire clamp of the present invention.
FIG. 2 is a side elevation thereof.
FIG. 3 is a plan view with the jaw-securing spring clip in open position.
FIG. 4 is a similar plan view but showing the upper jaw in open position.
FIG. 5 is a side elevation of the structure shown in FIG. 4.
FIG. 6 shows a modified arrangement for the keeper for the upper jaw.
FIG. 7 is a side elevation showing a modified form of the invention.

The clamp of the present invention includes a base which may be stamped out from sheet metal and which has side walls 10 and a connecting base wall 11 which has an opening to receive a rivet 13 for securing the base to a structure S. Two pivot pins 12 and 14 extend between said side walls and one of said pins forms a pivoted support for one or both of a pair of cooperating, channeled, jaw-like members 16 and 18 which receive the wire or other elongated article, shown in broken lines at 19 in FIGURE 1 and in full lines in FIGURE 2, in clamped relation.

The lower jaw 16 has a circular hinge loop 20 at one end which receives the pivot pin and its remaining section has an arcuate contour. At its sides it has downwardly extending tabs 21 which engage the arcuate upper edges 22 of the walls 10 and limit downward travel of the lower jaw. Pivoting of the lower jaw allows for radial misalignment as well as for axial misalignment that can result from manufacturing tolerances. In this first form of the invention the base or bracket is made as short as possible in order to conserve mounting space and the principal reason for pivoting the lower jaw is to permit it to be raised when it is to be secured to the structure by means of rivet 13. If conservation of space were not a consideration, the bracket could be lengthened to provide mounting holes and the lower jaw could then be fixed.

The upper jaw 18 has a somewhat longer arcuate face, which like jaw 16 corresponds generally to the diameter and peripheral contour of the work being supported. It is also formed with opposed, upwardly extending flanges 24 which strengthen the jaw and these flanges at their inner ends are enlarged to form ears 26 which are formed with aligned openings to receive pivot pin 12.

The keeper or clip 28 which resiliently retains the upper jaw in secured relation on the work piece is made from springy metal and has a hinge loop 29 for pivotally mounting the same on the second pivot pin 14. The keeper has an arcuate surface corresponding generally to the upper face of jaw 18, which it engages, and then has a generally U-shaped terminal of special contour. The first leg 31 of the U forms a hook-shaped extension of the keeper of generally C shape which engages around the pivot pin 12 and hinge loop 20 for the jaws and the other leg 32 forms a handle to release the clamp. To move the keeper downwardly to locked position pressure is applied by the thumb or forefinger of the operator at or about the point A (FIG. 2) and this motion tends to deflect the terminal section in a counterclockwise direction until the lower end of the C is able to spring forwardly, i.e., to the left in FIG. 2, to its home position shown. The spring, of course, is proportioned to cause the jaws to engage the work with a tight fit but it will be apparent that the slight differences in diameter in the work being supported will not diminish the effectiveness of this gripping action. It will also be noted that when the parts are in the fastened condition of FIG. 2 there is a gap between the free end of upper jaw 18 and the lower jaw. This further facilitates the ability of the device to take work of different diameters. In other words, if the wire has a greater diameter than that shown in FIG. 2 the free end of the spring keeper will nevertheless engage around the pivot element but will be under increased deflection.

In the modified form of the invention shown in FIG. 6, the lower jaw 36 may rest on the arcuate upper edges 37 of side walls 39 of the bracket. This jaw may be welded thereon or it may be hinged on pivot pin 41 as in the first embodiment, and the upper jaw 43 has ears 44 at its inner end which are carried on the same pivot pin. The bracket is secured to a structure by means of a screw 45 and a forward arcuate extension 46 of the upper jaw has an opening 47 to receive this mounting screw when the upper jaw is in the clamped position of FIG. 6. This forward arcuate extension of the upper jaw has a beam or lever action and is formed with a curved locking tab 49 which enters a slot 50 in an arcuate extension 51 of the base section of the bracket, the slot receiving and securing the locking tab.

The parts are so proportioned that the free end 46 of the upper clamping jaw is under some bending stress when the tab 49 enters the slot. Release is effected by deflecting extension 51 to the left to free the tab 49.

The further modified form shown in FIG. 7 is quite similar to the first form of the invention in the structure of the bracket 10', the lower jaw 16' mounted on curved upper edges 22' of the bracket, and the upper jaw 18' with its hinge loop 20' mounted on pivot pin 12'. The keeper or clip 60 in this instance, however, is formed with a loop 61 and the pivoting eye 62 extends around the outside of the pivot pin 14'. It will be seen that the locking or unlocking force $F_3$ is considerably less than that of FIG. 2 with the same clamping force $F_1$. The added clamping force is greater because it improves the mechanical advantage on both the jaw and the locking spring. It is also easier to open.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A support for detachably mounting a wire or the like in clamped relation and comprising a base provided with means for securing the same to a fixed structure and having spaced side walls having aligned arcuate cut-out sections on their upper edges, upper and lower channeled jaws formed from sheet metal, mounted between said walls, extending the full width of the area between said side walls, and arranged to receive the wire in clamped relation therebetween over the full area of their width, sections extending laterally from the lower jaw supported by the arcuate sections of the side walls, pivotal mounting means for the upper jaw to permit it to be raised to insert the wire, and a spring strap pivoted on the base and extending over the upper jaw and provided with a generally C-shaped terminal which releasably engages around said pivotal means to quickly secure the jaws in clamped relation on the wire, and to effect quick release thereof.

2. A support for detachably mounting a wire or the like in clamped relation and comprising a channeled base formed of sheet metal and provided with means for securing the same to a fixed structure and further provided with spaced side walls having opposed arcuate cut-out sections on their upper edges, upper and lower sheet metal jaws formed with curved complemental wire engaging sections, pivotally mounted on a common axis between said side walls at one end of the base, and extending the full width of the area therebetween so as to engage the wire over a substantial area, portions extending laterally from the curved section of the lower jaw and engaging the arcuate side wall sections and limiting downward movement of said lower jaw, and quickly detachable latching means for urging the upper jaw in the direction of the lower jaw with the wire positioned therebetween.

3. A support for detachably mounting a wire or the like in clamped relation and comprising a base provided with means for securing the same to a fixed structure and having spaced side walls, and upper and lower channeled jaws formed from sheet metal, pivotally mounted on a common axis between said side walls at one end of the base, and arranged to receive the wire in clamped relation therebetween, portions of the lower channeled jaw resting one the upper edges of the side walls and limiting downward movement thereof, and a spring strap pivoted at the other end of the base and extending over the upper jaw and provided with a generally V-shaped terminal which releasably engages the jaw pivot means to secure the jaws in clamped relation and whose free end forms a tab which can be manually raised to release the clamp from said jaw pivot means.

4. A support for detachably mounting a wire or the like in clamped relation and comprising a base provided with means for securing the same to a fixed structure and having spaced side walls, and upper and lower channeled jaws formed from sheet metal, pivotally carried between said side walls, at one end thereof, and extending the full width of the area between said walls and arranged to receive the wire in clamped relation therebetween over the full area of their width, portions of the lower channeled jaw resting on the upper edges of the side walls and limiting downward movement thereof, the pivotal mounting means at one end of the upper jaw permitting it to be raised to insert the wire, the other end of said upper jaw being provided with a spring extension having a locking tab at its terminal, the base having an upwardly curved spring extension with a slot to releasably receive the tab.

5. A support for detachably mounting a wire or the like in clamped relation and comprising a base provided with means for securing the same to a fixed structure and having spaced side walls having aligned arcuate cut-out sections on their upper edges, upper and lower channeled jaws formed from sheet metal, pivotally mounted on a common axis between said side walls at one end of the base, extending the full width of the area between said walls, and arranged to receive the wire in clamped relation therebetween, sections extending laterally from the lower jaw supported by the arcuate sections of the side walls, and a spring strap pivoted at the other end of the base, extending over the upper jaw, and provided at its outer end with attaching means for quick engagement around the jaw pivot means to secure the upper jaw in clamped relation on the wire and to effect quick release thereof.

References Cited in the file of this patent

UNITED STATES PATENTS

| 244,543 | Burke | July 19, 1881 |
| 1,456,824 | Olson | May 29, 1923 |
| 1,853,010 | Wray | Apr. 5, 1932 |
| 2,059,456 | Hodges | Nov. 3, 1936 |
| 2,650,948 | Findlay | Sept. 1, 1953 |

FOREIGN PATENTS

| 39,420 | Austria | Oct. 25, 1909 |